June 7, 1960 W. E. BURNS 2,939,345
VARIABLE-SPEED POWER TRANSMISSION
Filed Aug. 26, 1959 2 Sheets-Sheet 2

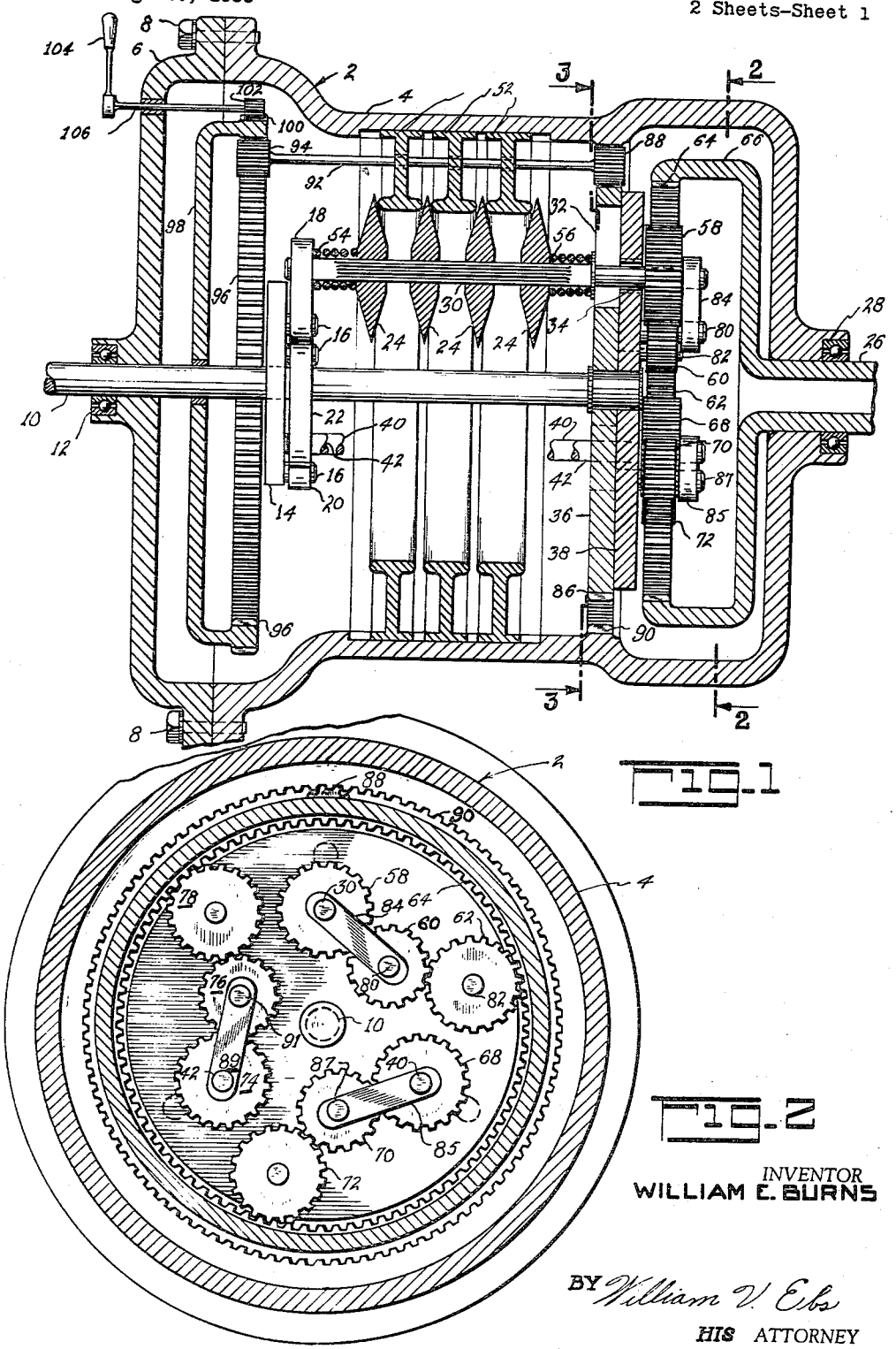

INVENTOR
WILLIAM E. BURNS

BY *William V. Ebs*
HIS ATTORNEY

United States Patent Office 2,939,345
Patented June 7, 1960

2,939,345
VARIABLE-SPEED POWER TRANSMISSION
William E. Burns, Denville, N.J., assignor to Curtiss-Wright Corporation, a corporation of Delaware
Filed Aug. 26, 1959, Ser. No. 836,194
11 Claims. (Cl. 74—796)

My invention relates to power transmissions of the type wherein the speed of an output shaft may be varied with respect to the speed of an input shaft in infinitely small steps. More particularly the invention relates to such type of power transmission in which the relative positions of engaging friction gears determine output speed.

In friction drives a considerable amount of heat is normally generated between frictionally engaging driving and driven members and appreciable wear occurs in contacting areas. One of the objects of this invention is to minimize such heat and wear. This is achieved by markedly reducing angular scrubbing of engaging friction gears in contact areas over that found in prior art devices. In the device of the invention a number of sets of rotatably mounted friction gears are driven in a path of revolution about a central axis. The revolving gears engage a plurality of surrounding rotationally fixed friction gears having an axis in common with the axis of revolution of the revolving gears and are therefore caused to rotate as they travel their path of revolution. The motion of these rotatably mounted gears is imparted to the output shaft of the device through a suitable gear train. Provision is made for adjusting the revolving gears inwardly and outwardly with respect to their axis of revolution such that "lines of contact" on the revolving gears may be altered at will to change the speed or direction of rotation of the output shaft. While it is convenient to refer to "lines of contact" between engaging friction gears, actually friction gears when operative contact along an annular area inasmuch as some deformation occurs at contacting locations. With the described construction angular scrubbing in the contacting areas between the friction gears is reduced to a minimum by reason of the geometry of the device, that is, having the rotationally fixed gears extend around the rotatably mounted friction gears. This arrangement also makes it possible to use the rotationally fixed friction gears in compensating for centrifugal forces generated by the rotatably mounted gears as they travel their path of revolution. This latter objective is achieved with biasing means which squeeze the contacting gears together with a force proportional to generated centrifugal forces.

Figure 3:
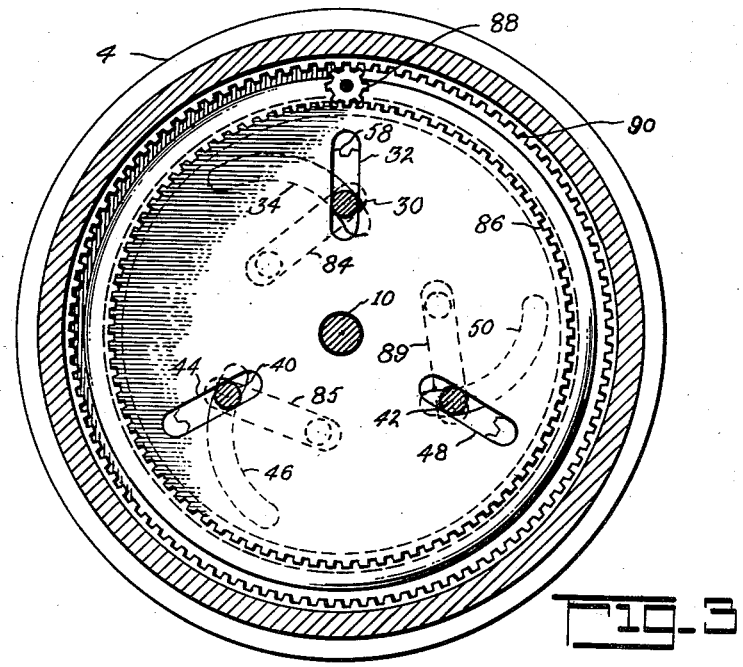

Objects and advantages of the invention other than those herein mentioned above will become apparent during the course of the description taken in connection with the accompanying drawings in which:

Fig. 1 is a vertical sectional view taken through the device of the invention,
Fig. 2 is a cross sectional view taken on the plane of the line 2—2 of Fig. 1,
Fig. 3 is a cross sectional view taken on the plane of the line 3—3 of Fig. 1,
Figs. 4, 5 and 6 are diagrammatic illustrations showing the manner in which the device functions to vary output speed.

Referring to the drawings, reference character 2 designates a housing which includes separable parts 4 and 6 secured together as by bolts 8. An input shaft 10 extends through one end of the housing where it is supported by the bearing 12. Fixedly secured on input shaft 10 is a circular plate 14 which includes three fixed abutments 16 equally spaced therearound. Pivotally mounted upon these abutments are the arms 18, 20 and 22, each of which rotatably supports a set of tapered friction gears. The drawings show only one such set of gears 24 (Fig. 1), the other sets, which are identical with the gear set shown, having been omitted for the purpose of simplifying the drawing. Each of the gear sets is operably connected to an output shaft 26 which extends through the housing at the rightward end (as shown in Fig. 1) where it is supported by the bearing 28. Of course, the number of rotatably mounted friction gear sets employed in the device need not be three. Indeed, any suitable number may be employed in a particular construction.

The tapered friction gears 24 of the one gear set are splined upon a shaft 30 having one end rotatably mounted in the arm 18 and having the other end extending through a pair of slots 32 and 34 in circular plates 36 and 38 which are rotatably mounted upon the input shaft 10. The other sets of tapered friction gears, not shown in the drawings, are similarly mounted on shafts 40 and 42 which are rotatably supported in the arms 20 and 22, and extend through the slots 44 and 46, and 48 and 50 in the plates 36 and 38. As will be explained more fully hereinafter, the plates 36 and 38 constitute means by which the tapered friction gears may be moved outwardly and inwardly with respect to the input shaft 10. The various sets of tapered friction gears are each biased into contacting relationship with a plurality of surrounding rotationally fixed friction gears 52 by springs such as the springs 54 and 56 on shaft 30. The friction gears 52 are slidable in housing structure 4 in directions parallel to the axis of input shaft 10, and the friction gears 24 are slidable upon the shaft 30 so that the force imposed by springs 54 and 56 upon adjacent gears is transmitted through the gears 24 and 52 to maintain a desired contacting relationship.

Fixedly secured on the rightward end of shaft 30 is a gear 58 of somewhat smaller diameter than the friction gears 24. The gear 58 engages an idler 60 which in turn meshes with another gear 62. Gear 62 engages the teeth 64 of a ring gear 66 which is integral with the output shaft 26 to complete a driving connection between shaft 30 and the output shaft 26 of the device. Gears 68, 70, 72, and 74, 76, 78 correspond to the gears 58, 60, and 62, and drivably connect shafts 40 and 42 respectively to the ring gear 66. As shown, the idler gear 60 and gear 62 are rotatably mounted on shafts 80 and 82, which are fixedly secured on plate 38. The gears 70, 72, and 76, 78 are rotatably mounted in a similar manner on shafts secured on plate 38. Shaft 30 has its extreme rightward end rotatably mounted in an arm 84 which is pivotally mounted on the shaft 80. The pivotal axes of arms 84 and 18 correspond such that shaft 30 may be freely moved inwardly and outwardly relative to the axis of input shaft 10. Shafts 40 and 42 are mounted in a similar manner to shaft 30. As shown, shaft 40 is rotatably secured in the arm 85 which is pivotally mounted on fixed shaft 87, whereas shaft 42 is rotatably secured in the arm 89 which is pivotally mounted on fixed shaft 91.

As noted hereinbefore, each of the shafts 30, 40 and 42 extend through a pair of slots in plates 36 and 38. As shown in Fig. 3 the slots 32, 44 and 48 in plate 36 extend in a radial direction with respect to the axis of input shaft 10, whereas the slots 34, 46 and 50 in plate 38 are curved and extend at an angle to the slots in plate 36. The curvature of the slots 34, 46 and 50 is determined according to the curved outline defined by movement of the shafts 30, 40 and 42 respectively about their pivotal mountings. The periphery of plate 36 is provided with gear teeth 86 which are engaged by a gear 88. The gear 88 also meshes with gear teeth 90 which extend around the inside of housing structure 4. As shown, gear 88 is mounted on one end of the shaft 92, the other end of which contains a similar gear 94. Gear 94 meshes with the internal teeth 96 of a ring gear 98, rotatably mounted on input shaft 10, the ring gear also having external teeth 100 which are engaged by the gear 102. Gear 102 is actuable by lever 104 which connects with gear 102 through rod 106.

In the operation of the device, the input shaft 10, upon rotation, acts through plate 14 and pivotally connecting arms 18, 20 and 22 causing the several sets of tapered friction gears to travel a path of revolution about the axis of the input shaft. By reason of the engagement of the shafts 30, 40 and 42 with the sides of the slots in plates 36 and 38, these plates are also caused to rotate. Gear 88 in engagement with teeth 86 is caused to revolve in the housing on gear teeth 86. The motion of the gear 88 is imparted to gear 94 through the connecting shaft 92 and the gear 94 is caused to move around the inside of ring gear 98 on teeth 96. The internal teeth 96 of ring gear 98 are the same in number and are at the same diameter as the fixed teeth 90 on housing structure 4. Therefore, no rotation is imparted to the ring gear 98. As the tapered friction gears, such as the gears 24, travel their path of revolution, they are caused to rotate by reason of their engagement with rotatably fixed friction gear members 52. The combined effect of the revolving of the tapered friction gears, and of their rotation is transmitted to the output shaft 26 through the connecting gearing mentioned hereinbefore. The speed of the output shaft is dependent upon the position of the tapered friction gear sets with respect to the rotatably fixed friction gears 52.

The tapered friction gears may be moved inwardly and outwardly with respect to the axis of input shaft 10 to change the location of "lines of contact" on the engaging friction gears relative to the axes of the rotatably mounted gears by means of lever 104. When lever 104 is moved, its motion is imparted to the plate 36 through rod 106, gear 102, gear 98, gear 94, shaft 92 and gear 88, causing the plate 36 to move relative to plate 38 in one direction or another according to the direction of movement of actuating lever 104. Upon such relative movement of plate 36 the shafts 30, 40 and 42 are urged by the sides of slots 32, 44 and 48 to new positions in the slots 34, 46 and 50 in plate 38 while the shafts moved about their pivotal mountings. By moving shafts 30, 40 and 42 inwardly or outwardly an appropriate amount, not only may the speed of the output shaft be varied but its direction of rotation may be changed as well.

Figure 4:
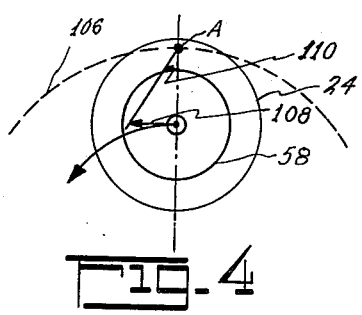
Figure 5:
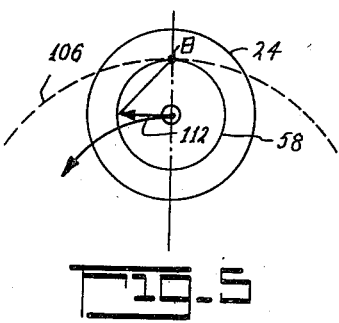
Figure 6:
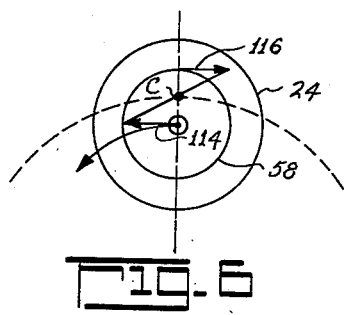

The manner in which the device functions to change output speed and direction or rotation of the output shaft, may be best understood by referring to Figs. 4, 5 and 6 of the drawing. The diagrams in these figures show the outline of gears 58 and 24 and the "line of contact" 106 between the gears 24 and 52, such "line of contact" being subject to change in the manner mentioned. In Fig. 4 the "line of contact" is shown to be outside the radius of gear 58. As the tapered friction gears travel their path of revolution, each such gear rolls on a rotatably fixed gear 52, as about point A on the "line of contact." Assuming the tapered friction gears to be traveling about the axis of shaft 10 in a counterclockwise direction as in the diagram, such gears have a velocity indicated, for example, by velocity vector 108. The velocity at the radius of gear 58, and therefore the peripheral velocity of gear 58 is defined by velocity vector 110. If the tapered friction gears are moved inwardly from the position shown in Fig. 4 to the position indicated in Fig. 5 such that the rotatably mounted and the rotationally fixed gears engage at a radius equal to the radius of gear 58, gear 58 has no peripheral velocity. A velocity vector such as 112 defines the velocity of shaft 20, but no velocity vector can be drawn at a point B on the "line of contact" of the engaging friction gears, and the peripheral velocity of gear 58 is therefore zero. Assuming the tapered friction gears to be moved further inwardly to a location such that the line of contact between the rotatably mounted and rotationally fixed gears is inside the radius of gear 58, the peripheral velocity of gear 58 is reversed from that which occurs in the case illustrated in Fig. 4. In this case the tapered friction gears roll about a point C which is a point of zero velocity. If the velocity of the shaft 30 at it travels its path of revolution is indicated by velocity vector 114 the peripheral velocity of 58 is of necessity indicated by the velocity vector 116 which extends in the opposite direction from the peripheral velocity vector shown in Fig. 4.

The speed of the output shaft 26 and its direction of rotation is directly determined by the peripheral velocity of gear 58, the motion of the gear 58 being transmitted to the output shaft through the connecting gear elements. Accordingly, with the tapered friction gears disposed so that the lines of engagement between the rotatably mounted and rotationally fixed friction gears are at the radius of the gear 58 no rotation of the output shaft occurs, but as the tapered friction gears are moved inwardly speed of the output shaft becomes increasingly greater in one direction, whereas the speed becomes increasingly greater in the other direction as the tapered friction gears are moved outwardly.

Assuming a particular speed for input shaft 10, the magnitude of centrifugal forces due to the revolving friction gears depends upon their distance from the axis of the input shaft as determined by the position of lever 104. Such centrifugal forces are resisted by springs such as 54 and 56. If the revolving friction gears are moved outwardly by lever 104 the resulting centrifugal forces increase, however at the same time, the tapered friction gears such as 24 acting through the rotationally fixed friction gears 52 compress the springs. The springs act in opposition through the engaging friction discs to prevent the rotatable mounted friction discs from being moved outwardly by the increased centrifugal forces. A reduction in the centrifugal forces due to the revolving friction gears brought about by moving such friction gears inwardly results in a corresponding reduction in the opposition forces exerted by the springs.

While I have shown and described only one embodiment of my invention, it will be readily apparent to those skilled in the art that various changes and modifications may be made in the disclosed structure without departing from the spirit and scope of the invention as covered in the annexed claims.

I claim:

1. A variable-speed transmission comprising a plurality of rotatably mounted friction gears, means including an input shaft for driving the rotatably mounted friction gears in a path of revolution about a central axis, a plurality of rotationally fixed gears extending around the rotatably mounted friction gears and engaged thereby for causing the rotatably mounted gears to rotate while traveling their path of revolution, means for moving the rotatably mounted gears inwardly and outwardly with respect to their axis of revolution to change the location of contacting portions of the engaging friction gears relative to the axis of rotation of the rotatably mounted gears to thereby change the speed of the rotatably mounted gears, a gear train operatively connected to the rotatably mounted friction gears, and an output shaft connected to the gear train for rotation thereby.

2. The combination as defined in claim 1 wherein the rotatably mounted friction gears and the rotationally fixed friction gears are slidable in a direction parallel to the central axis, and with the addition of means for biasing the rotationally mounted and rotationally fixed friction gears into contacting positions.

3. The combination as defined in claim 2 wherein the rotatably mounted friction gears have the form of tapered discs.

4. A variable-speed transmission comprising a rotatable shaft having a plurality of friction gears mounted thereon, means including an input shaft for driving the rotatable shaft in a path of revolution about a central axis, a plurality of rotationally fixed friction gears extending around the gears on said rotatable shaft and engaged thereby for causing the rotatable shaft to be rotated as the rotatable shaft and gears thereon travel their path of revolution, means for moving the rotatable shaft inwardly and outwardly with respect to its axis of revolution to change the locations of contacting portions of the engaging friction gears relative to the axis of rotation of the rotatable shaft to thereby change the speed of the rotatable shaft, a gear train operatively connected to the rotatable shaft, and an output shaft connected to the gear train for rotation thereby.

5. The combination as defined in claim 4 wherein the rotatably mounted friction gears and the rotationally fixed friction gears are slidable in a direction parallel to the central axis, and with the addition of spring means on the rotatable shaft for biasing the rotatably mounted and rotationally fixed gears into contacting positions.

6. The combination as defined in claim 4 wherein said gear train includes an actuating gear on said rotatable shaft of smaller diameter than the diameter of the friction gears on the rotatable shaft whereby the output shaft may be driven in one direction or another according to whether the friction gears on the rotatable shaft and the rotationally fixed friction gears contact each other at a radius from the axis of the rotatable shaft greater or less than the radius of the actuating gear.

7. The combination as defined in claim 4 wherein the gear train includes a gear mounted on the rotatable shaft, a ring gear connected to the output shaft, and other gear means operatively connecting the gear on the rotatable shaft and the ring gear.

8. The combination as defined in claim 4 wherein the means for moving the rotatable shaft inwardly and outwardly includes a pair of plates having registering slots which receive the rotatable shaft and each of which extends at an angle with respect to the other, the plates being rotatable about the central axis, said means for moving the rotatable shaft inwardly and outwardly also including means for moving one plate relative to the other to thereby cause the rotatable shaft to slide in the slots and move inwardly or outwardly according to the direction of the relative movement of one plate with respect to the other.

9. The combination as defined in claim 8 wherein the means for producing movement of one plate with respect to the other includes mechanism drivably connected to one plate, and actuating means connected to the mechanism and maintained in a fixed position thereby during rotation of the plates about the central axis by the rotatable shaft as the rotatable shaft travels its path of revolution.

10. A variable-speed transmission comprising a plurality of rotatably mounted friction gears, means including an input shaft for driving the rotatably mounted friction gears in a path of revolution about a central axis, a plurality of rotationally fixed friction gears extending around the rotatably mounted friction gears and engaged thereby for causing the rotatably mounted gears to rotate while traveling their path of revolution, means for moving the rotatably mounted gears inwardly and outwardly with respect to their axis of revolution to change the location of contacting portions of the engaging friction gears relative to the axis of rotation of the rotatably mounted gears to thereby change speed of the rotatably mounted gears, means adjustable according to the position of the rotatably mounted gears with respect their axis of revolution for resisting centrifugal force due to the revolving friction gears, a gear train operatively connected to the rotatably mounted friction gears, and an output shaft connected to the gear train for rotation thereby.

11. A variable-speed transmission comprising a rotatable shaft having a plurality of friction gears mounted thereon, means including an input shaft for driving the rotatable shaft in a path of revolution about a central axis, a plurality of rotationally fixed friction gears extending around the gears on said rotatable shaft and engaged thereby for causing the rotatable shaft to be rotated as the rotatable shaft and gears thereon travel their path of revolution, means for moving the rotatable shaft inwardly and outwardly with respect to its axis of revolution to change the location of contacting portions of the engaging friction gears relative to the axis of rotation of the rotatable shaft to thereby change the speed of the rotatable shaft, spring means on the said rotatable shaft adjustable through the engaging friction gears according to the position of the rotatably mounted gears with respect to their axis of revolution for resisting centrifugal forces due to the revolving friction gears, a gear train operatively connected to the rotatably mounted friction gears, and an output shaft connected to the gear train for rotation thereby.

No references cited.